United States Patent [19]

Lowe et al.

[11] Patent Number: 5,503,507
[45] Date of Patent: Apr. 2, 1996

[54] HIGH SPEED CUTTING INSERT WITH IMPROVED CHIP GROOVE

[75] Inventors: Tony Lowe, Royal Oak; Karl Katbi, Troy; John Patterson, Hazel Park; Thomas Bernadic, Madison Hts.; Brendan Brockett, Dearborn Hts., all of Mich.

[73] Assignee: Valenite Inc., Madison Heights, Mich.

[21] Appl. No.: 205,459

[22] Filed: Mar. 4, 1994

[51] Int. Cl.⁶ ..................................................... B23P 15/28
[52] U.S. Cl. ............................................ 407/114; 407/116
[58] Field of Search ..................................... 407/113–116

[56] References Cited

U.S. PATENT DOCUMENTS

| | | | |
|---|---|---|---|
| 4,856,942 | 8/1989 | Bernadic et al. | 407/114 |
| 4,969,779 | 11/1990 | Barten | 407/114 |
| 5,147,159 | 9/1992 | Lowe et al. | 407/116 |
| 5,180,258 | 1/1993 | Bernadic et al. | 407/114 |

Primary Examiner—Bruce M. Kisliuk
Assistant Examiner—Eileen P. Morgan
Attorney, Agent, or Firm—John W. Gregg

[57] ABSTRACT

A polygonal indexable cutting insert with improved chip control design having a radiused chip groove and discontinuous chip breaker pads for fine finishing in turning and boring operations.

6 Claims, 1 Drawing Sheet

5,503,507

HIGH SPEED CUTTING INSERT WITH IMPROVED CHIP GROOVE

BACKGROUND OF THE INVENTION

1. Field of the Invention

The present invention relates to a high speed cutting insert with improved chip groove design for fine finishing in turning and boring operations.

The present invention further relates to a polygonal throwaway insert to turn ductile and super alloy materials at moderate to high cutting speeds at low feed rates and light depths of cut.

The present invention further relates to a polygonal indexable cutting insert with improved chip groove design for use with ISO screw fasteners to seat the insert in a tool holder pocket.

The present invention further relates to an improved cutting insert with a moderate to high cutting land along the entire cutting edge to provide increased sheer, and a full radius chip groove to curl inserts at right angles to increase breakability of the chips, and a chip breaker pad which is discontinuous with the central locating surface to enhance strains induced into the chip and provide access for coolant to reduce thermal shock to the insert body during use.

2. Description of the Related Art.

Bernadic et al., U.S. Pat. No. 4,856,942 discloses a polygonal cutting insert for cutting aluminum metal which comprises rounded cutting corners with adjacent side surfaces joined at an angle from about 33 to 35 degrees. Grooved recesses extending along each cutting edge have a particular geometry which includes a shallow descending surface followed by a steeply descending surface leading to the bottom of the grooved recess. There is no showing of the radiused chip groove design of the instant invention, and neither is there are showing of the discontinuous chip breaker pads of the instant invention.

Bernadic et al., U.S. Pat. No. 5,180,258 discloses a high feed/heavy depth of cut polygonal throwaway insert for use in the aluminum wheel turning market. The cutting land has "tooth like" cavities along its flanks to reduce friction and so allow for increased material removal rates. A chip breaker pad is provided at each nose portion of the insert which is lower than the cutting land, and is contiguous, and directly adjacent to, the cutting land. In addition, there are also provided separate island forms, to allow work piece material to flow around increase the material removal rate.

This differs from the instant invention because there is no showing of the radiused chip groove design, and further, no showing of the discontinuous chip breaker pads which are separated from the cutting land by the improved chip groove design.

SUMMARY OF THE INVENTION

The present invention is directed to a polygonal, indexable cutting insert for use in turning operations involving ductile and super alloy materials. The insert is comprised of an upper surface and a lower surface, which are generally planar and separated by a side wall extending substantially unbroken therebetween to define a body. It is preferred that the insert be positive, so that those skilled in the art recognize that the intersection of the sidewall with the lower surface is at an obtuse angel, as measured relative to lower surface, and the intersection of the sidewall with the upper surface, which defines the cutting edge, is at an acute angle, relative to the upper surface. However, it is contemplated that the insert may be negative, in which case the intersection of the sidewall with the upper and lower surface is at right angles. The cutting edge extends around the entire periphery of the insert.

Each side wall is comprised of side flanks, each side flank being defined as that portion of the sidewall extending from one corner to an adjacent corner of the insert. At least two diametrically opposed corners of the insert are nose portions of the insert.

A positive planar cutting land entry surface descends from the cutting edge and joins a generally radiused chip groove floor rearward which is rearward of the cutting land. A generally planar locating surface is disposed on the upper surface and projects from the cutting land entry surface above the periphery of the insert. The locating surface surrounds a centrally located aperture extending through the upper surface and exiting from the lower surface. The locating surface had an inclined, planar chip breaking ramp surface extending, along the flanks, to said chip groove floor.

The insert is further equipped with chip breaker pads at said nose portions, which project above the periphery cutting edge, but below the locating surface. The nose portions are discontinuous from the locating surface and have an ascending surface intersecting with, and rearward from, the radiused chip groove. The chip breaker pads have a generally planar top form surface 50, and is separated from the locating surface by a top form channel. The top form channel allows coolant to flow around the chip breaker pad and cool the insert, thereby decreasing any thermal shock to the insert during cutting.

DETAILED DESCRIPTION OF A PREFERRED EMBODIMENT

Figure 1:
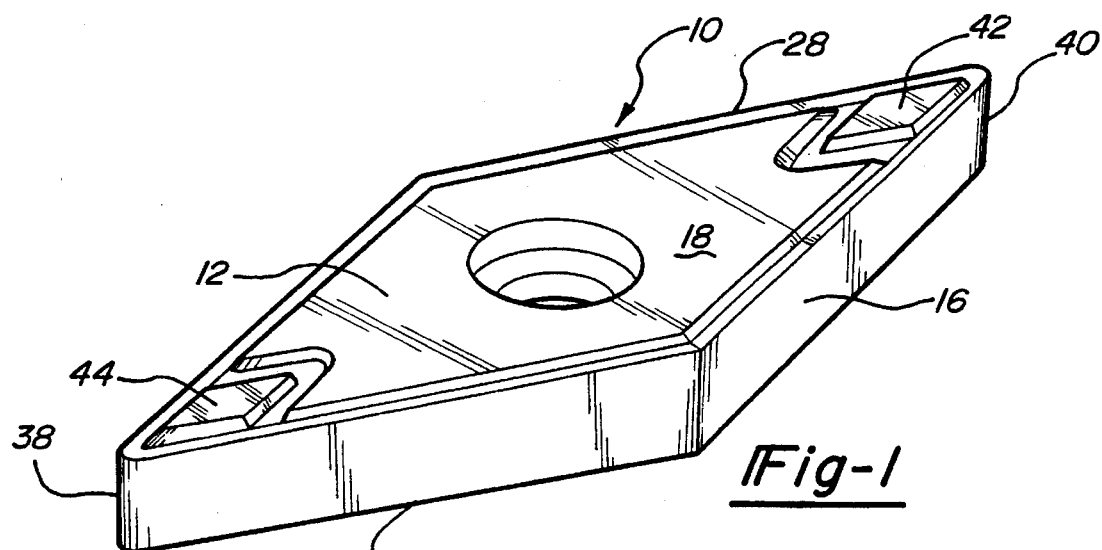
FIG. 1 is a three dimensional perspective view of the insert.
Figure 2:
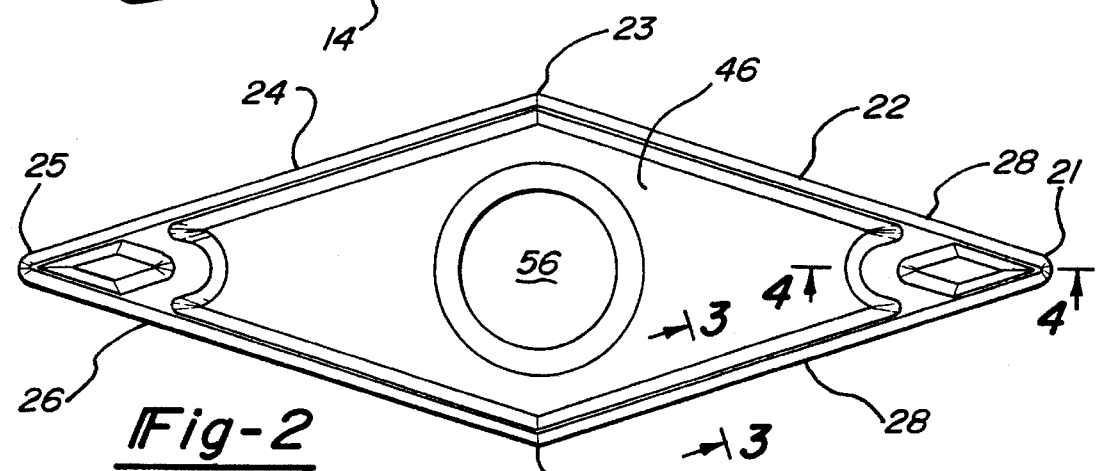
FIG. 2 is a top plan view of the insert.

Turning now to the drawings wherein like numeral depict like structures, and particularly to FIGS. 1 and 2, polygonal indexable insert 10 is comprised of upper surface 12, lower surface 14, separated by sidewall 16 extending substantially unbroken therebetween to define the body 18 of the insert. The upper and lower surfaces are generally planar and generally parallel to each other.

The side wall is comprised of side flanks which are defined as a portion of the side wall extending from one corner to an adjacent corner of the insert. Thus, in the insert depicted in the drawings, there are four side flanks 22, 24, 26, and 28, extending from corners 21, 23, 25, and 27 respectively. Note that at least two diametrically opposed corners are nose portions 38 and 40. The side flanks are generally planar, and the sidewall intersect the upper surface to form a cutting edge 28, extending around the periphery of the insert. The side flanks intersect each other at the nose portions of the insert at an angle of about 33 to 38 degrees, and at the non cutting corners 23 and 27 at an angle which is supplemental to nose portions.

For purposes of the following discussion, rearward is toward the center of the insert relative to the cutting edge, whereas forwardly is away from the center of the insert, relative to the cutting edge.

Rearward of the cutting edge is descending entry surface 30, which extends around the entire cutting edge of the insert. The entry surface is generally planar and descends from the cutting edge such that is inclined in a positive direction relative to the cutting edge. Preferably, the entry surface is inclined 14 degrees.

Figure 3:
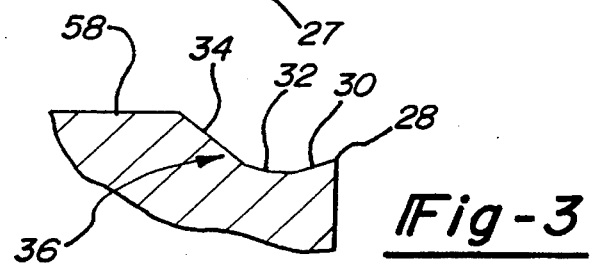
FIG. 3 is a detailed cut away view of the insert taken along line 3—3 of FIG. 2.
Figure 4:
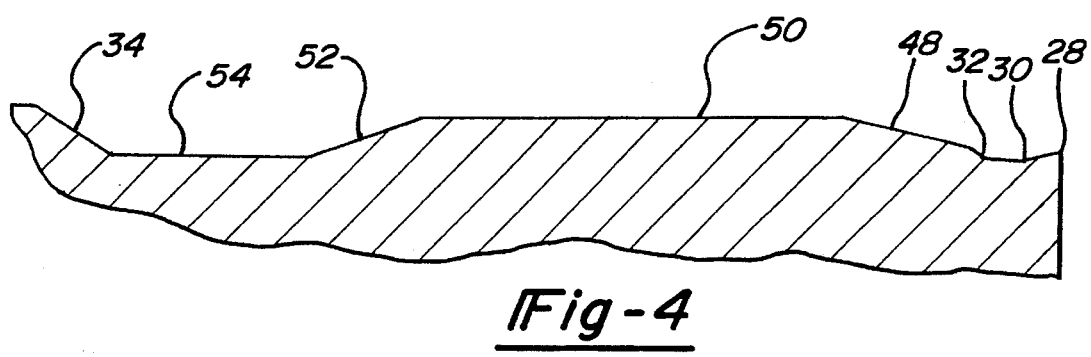
FIG. 4 is a detailed cut away view of the insert taken along line 4—4 of FIG. 2.

Turning now to FIGS. 3 and 4, rearward of the entry surface is radiused chip groove 32, which is concavely radiused. Preferably, the chip groove is radiused 0.02 inches. As seen in FIGS. 1 and 2, the insert is further equipped with a locating surface 46 which, as seen in FIG. 3 and 4, projects above the periphery of the insert. The locating surface surrounds a centrally located aperture 56, which extends through the upper surface and exits from the lower surface. The aperture is configured such that it accepts an ISO screw fastener, such as is well known to those skilled in the art. The locating surface has a generally planar seating surface and an inclined, planar, chip ramp breaking surface. Along the flank of the insert the ramp surface intersects the radiused chip groove floor. Preferably, the ramp surface is planar and inclined at a 35 degree angle.

Each nose portion has a chip breaker pad 42 and 44, respectively, which are separated, or discontinuous with, the locating surface on the upper surface of the insert. The chip breaker pads are in close proximity, but separated from the entry surface and project above the periphery of the cutting edge, but are below the locating surface. Turning to FIG. 4, the chip pad has a planar chip pad ascending surface 48 rearward of the chip groove floor, and intersect a top surface 50 on the chip pad. The top surface is generally planar. The chip pad ascending surface 48 in preferably inclined at a 35 degree angle. Rearward of the top surface is chip pad descending surface 52, which intersect planar channel floor 54. The planar channel floor intersects the ramp surface 34 on the locating surface.

The insert as described herein is designed to turn ductile or super alloy materials at a moderate to high cutting speeds at low feed rates and depths of cuts. Specifically, the feed rates are in the range of about 0.004 to 0.010 IPR and has a depth of cuts in the range of about 0.010 to 0.080 inches.

While one embodiment has been described with regard to this invention, many variations are possible without departing from the scope and spirit of the invention, as set forth in appended claims.

We claim:

1. A polygonal, indexable cutting insert, comprising an upper surface and a lower surface in spaced relationship to each other and generally parallel to each other; said surfaces separated by a planar side wall extending substantially unbroken therebetween to define a body; said sidewall comprised of side flank portions; each said side flank portion defined as a portion of the side wall extending from one corner of the insert to an adjacent corner of the insert; said side wall intersects said upper surface to define a cutting edge extending along the entire periphery of the insert; at least two corners being diametrically opposed nose portions; a positive, planar cutting land entry surface descending directly from said cutting edge; a generally concave, radiused chip groove floor rearward said cutting land surface; a generally planar locating surface on said upper surface projecting from said cutting land entry surface above said periphery; said locating surface surrounding a centrally located aperture extending through the upper surface and exiting from said lower surface; said locating surface having an inclined, planar chip breaker ramp surface extending, along the flanks, from said chip groove floor to intersect a planar seat surface; said insert further equipped with chip breaker pads projecting above the periphery but below the locating surface at the nose portions of the insert; said pad being discontinuous from said locating surface; each said chip breaker pad having an ascending surface rearward from said chip groove floor and intersecting a planar top surface; said chip breaker pads separated from said locating surface by a channel.

2. The insert of claim 1, wherein said ascending surface has a greater incident angle proximal the chip groove than the ascending surface proximal to the channel.

3. The insert of claim 1, wherein the channel is planar.

4. The insert of claim 1, wherein the chip groove has a concave radius of about 0.02 inches.

5. The insert of claim 1, wherein said chip entry surface is inclined at about 14 degrees.

6. The insert of claim 1, wherein said chip breaker ramp surface is inclined about 35 degrees.

* * * * *